Figure 1:
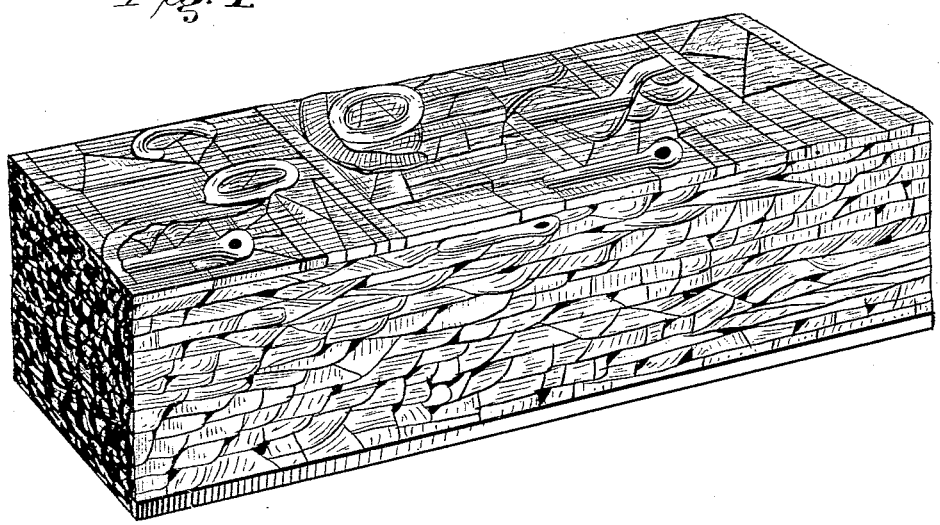

(No Model.)

F. B. FELT.

FAGOTING METAL.

No. 352,947. Patented Nov. 23, 1886.

Attest
Wm J Danny
A. E. Hansmann.

Inventor
Frank B. Felt,
By Foster & Freeman
Attorneys

UNITED STATES PATENT OFFICE.

FRANK B. FELT, OF PULLMAN, ILLINOIS.

FAGOTING METAL.

SPECIFICATION forming part of Letters Patent No. 352,947, dated November 23, 1886.

Application filed October 4, 1886. Serial No. 215,283. (No model.)

*To all whom it may concern:*

Be it known that I, FRANK B. FELT, a citizen of the United States, and a resident of Pullman, county of Cook, State of Illinois, have invented certain new and useful Improvements in the Manufacture of Iron Plates, Bars, Shafts, and Axles, of which the following is a specification.

In the manufacture of iron plates, shafts, and axle-bars it has been common to make them at times by piling a number of rolled or finished bars into a fagot, which is heated and reduced to weld and form the same; but this has proved to be extremely expensive, and the rolled plates or bars are apt to be "cold-short" or "red-short," according to the character of the metal employed, resulting in articles of inferior strength. Another objection arising in the manufacture of axle-bars thus made (unless the bar is rolled a number of times, which is practically impossible on account of the expense) is, that the cinder remains in the bar and weakens the same, and presents honeycomb surfaces when the bar is turned down at the ends to form journals. By making the articles from fagots formed of scrap-iron some of the objections incident to the use of rolled bars have been obviated, the articles costing much less, and the varied character of the scrap preventing the finished article from being either cold-short or hot-short; but plates, shafts, and axle-bars made in this way have always been found to be lacking in tensile strength, and accidents repeatedly result from the use of those which have stood the regulation tests before being put into use.

I have discovered that the cause of the weakness of plates, shafts, and axle-bars made as heretofore from scrap has resulted partly from the fact that the original fiber of the metal in the scrap runs in different directions in the finished article and partly from the welding of the said fagot under the hammer, whereby the dirt and cinders are hammered into the bar and weaken the same, the results being all the more disastrous from the source of weakness being concealed. I have also discovered that I can secure the advantage in reduction of expense which results from the manufacture of such articles from scrap, and at the same time obviate the objections heretofore existing, by so piling or arranging the particles of scrap in each fagot that the original fibers of the iron in all the pieces shall be parallel to each other and to the sides of the fagot, and that by first welding such fagot by means of rolls I am enabled to draw out all the particles in the line of the fibers, and at the same time squeeze out all particles of dirt and cinder, and then by combining a series of the bars or strips thus formed, and heating and welding together under the hammer, I am enabled to produce articles in which the fibers are greatly condensed and consolidated.

Figure 2:
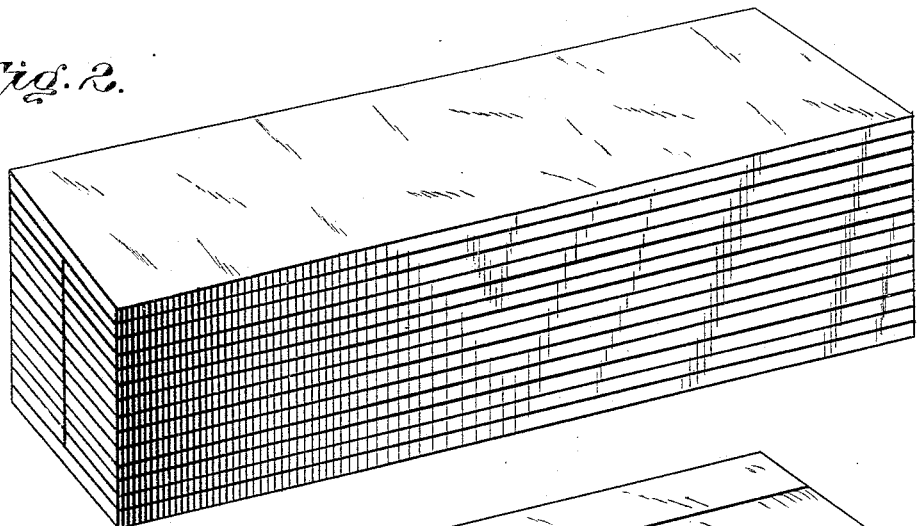
Figure 3:
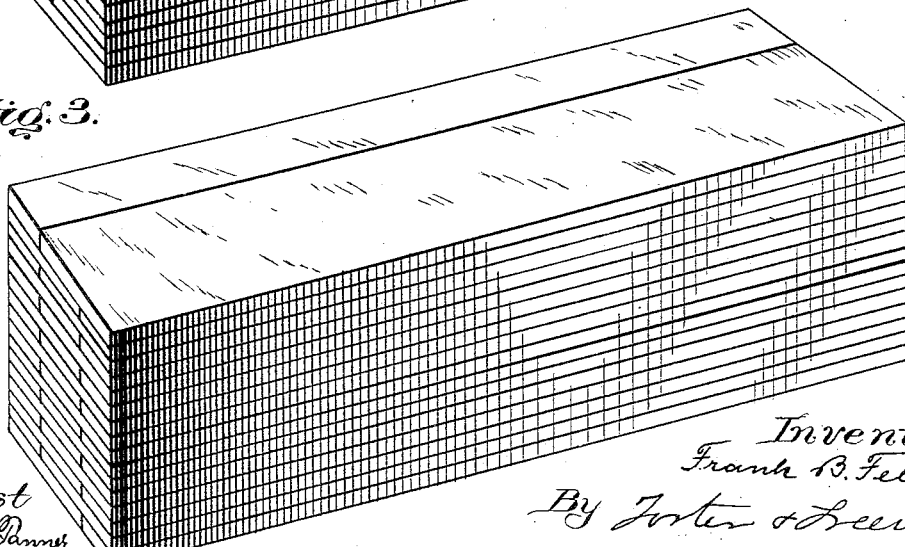

In the accompanying drawings, Figure 1 illustrates a pile or fagot with the parts arranged as required in carrying out my invention. Figs. 2 and 3 show piles made of the bars rolled from the piles shown in Fig. 1.

In making up the pile, I, so far as possible, place each piece of scrap, Fig. 1, so that the fibers of that piece shall lie parallel to the fibers of every other piece in the fagot, the line of the fibers in the pieces being indicated by the shading lines. It will be seen on reference to said figure that while some of the pieces lie transversely in the pile or fagot, they are so arranged in order to bring their fibers parallel to those of other pieces which lie parallel to each other and to the sides of the fagot. After all the pieces have thus been arranged so as to secure to as great a degree as possible the parallelism of the fibers of all the pieces, the whole mass is bound together by wrapping wires or bands around the mass and round the board on which it rests, or in any other suitable manner. The fagot is now heated, as usual, and after attaining the proper temperature is hammered, or preferably passed between rolls, so as to weld all the particles together and reduce the fagot to a long bar or plate. The effect of the rolls upon the mass of pieces thus arranged is to still further straighten the fibers by drawing out those pieces which were bent or crooked into lines parallel to the others, with the further important result of squeezing and carrying out the dirt and cinder, so that the bar or plate formed consists of a continuous piece, unbroken by flaws, imperfect welds, or the presence of cinder, and with the fiber of the metal at all points lying in one direction parallel to the length of the bar. The bars thus produced may be used as made for small shafting and other purposes without further manipulation; but for car-axles and large shafting a second pile is made of short sections of such bars of the same or of different widths, as shown in Figs. 2 and 3, and these are drawn down or reduced under the hammer to the proper dimensions.

The use of the hammer is preferable to rolling in reducing the second pile, because the dirt and cinder have been eliminated, and it is no longer necessary to displace any particles longitudinally; on the contrary, it is desirable to condense and compact them laterally, so as to form a dense solid piece, which is effected by the blows of the hammer with but comparatively a slight elongation of the mass.

The test usually applied to axle-bars preparatory to their acceptance is one of great severity, and consists in a succession of blows from a heavy hammer let fall from an increasing height upon the middle of the axle-bar, the ends being properly supported and the axle-bar being turned over between the blows. The standard test, known as the "Pennsylvania test," involves the use of a hammer weighing sixteen hundred and forty pounds, and a series of blows therefrom consisting of three blows from a height of ten feet, followed by two blows from a height of fifteen feet. It has been found almost impossible to obtain a scrap-iron axle-bar capable of standing this severe test. Very frequently the axle-bar breaks at the third blow, and still more frequently at the fourth blow or first fifteen-foot drop.

Axle-bars made by my method are of such strength as to easily and uniformly stand a much severer test than that above specified. Thus, in addition to and immediately following the three ten and two fifteen foot drops of the sixteen-hundred-and-forty-pound hammer, I have subjected them to two twenty and five fifteen foot drops of the same hammer without breaking. In no instance has an axle-bar broken before the second twenty-foot drop of the series, and very rarely has one broken before receiving the fourth of the final series of fifteen-foot blows.

This great improvement in strength is derived from, first, carefully preserving the original direction of the fiber of all the scrap and keeping it lengthwise of the axle-bar; second, eliminating the cinder and impurities by the first operation of rolling; and, third, compacting the metal by the final operation of hammering.

While the strength of the product is thus improved by the method described, the cost thereof is not materially greater than the inferior and least costly axle-bar mentioned, as I use precisely the same scrap material, and do not materially increase the expense of the operations thereon. Moreover, such is the gain in strength derived from my method that from inferior scrap an axle-bar may be attained greatly superior to any made by former methods from the choicest scrap or other material, inasmuch as a shaft or axle-bar made from scrap cannot be cold-short or red-short, like one made from finished bars.

In carrying out my process, if necessary or desirable, small scrap-binders may be placed crosswise in the pile to hold the latter together; but even in this case it is preferable to have the fibers of the binders parallel to those of the scrap.

I claim—

1. The improvement in the art of manufacturing iron plates, shafts, and axle-bars herein described, consisting in forming a fagot from pieces of scrap so arranged that the original fiber of the iron in each piece shall be parallel to the fiber in the other pieces and to the sides of the fagot, and then heating and reducing the fagot, substantially as described.

2. In the manufacture of iron plates, shafts, and axle-bars, forming a pile from pieces of scrap with the fibers of all the pieces parallel, and then heating and reducing said pile by rolling it longitudinally, substantially as and for the purpose set forth.

3. In the manufacture of iron plates, shafts, and axle-bars, forming a pile of scrap with the pieces so arranged that the fibers of all shall be parallel, then heating and rolling the pile to a bar, and then piling sections of such bars, reheating, and compacting and reducing by means of a hammer to the form of a plate, shaft, bar, or axle, substantially as described.

In testimony whereof I have signed my name to this specification in the presence of two subscribing witnesses.

FRANK B. FELT.

Witnesses:
CHARLES E. FOSTER,
A. E. T. HANSMANN.